United States Patent [19]
Clark

[11] 3,920,232
[45] Nov. 18, 1975

[54] APPARATUS FOR ALIGNING PIPE ENDS

[76] Inventor: Julius Clark, P.O. Box 555, Broken Arrow, Okla. 74012

[22] Filed: July 16, 1974

[21] Appl. No.: 489,064

[52] U.S. Cl. .................. 269/25; 29/200 P; 269/43; 269/69; 269/208
[51] Int. Cl.² ........................................ B23P 19/00
[58] Field of Search .......... 29/200 P, 200 J; 269/25, 269/27, 31, 43, 69, 70, 208, 287, 288

[56] References Cited
UNITED STATES PATENTS

| | | | |
|---|---|---|---|
| 1,430,226 | 9/1922 | Goodreau | 269/27 |
| 2,347,854 | 5/1944 | Tyson | 269/208 |
| 2,800,867 | 7/1957 | Smith | 269/287 |
| 2,980,432 | 4/1961 | Benson | 269/287 |
| 3,414,950 | 12/1968 | Phariss | 269/43 |
| 3,828,413 | 8/1974 | Province | 29/200 P |

*Primary Examiner*—Roy Lake
*Assistant Examiner*—Mark S. Bicks
*Attorney, Agent, or Firm*—Young & Thompson

[57] ABSTRACT

A pipe end line-up clamp encircles adjacent pipe ends and presses on them at selected points to bring them into alignment so they can be welded together. A frame can be positioned at any selected location about the clamp and pivotally supports the outer end of a hydraulic ram whose inner end carries a shoe that bears against the pipe. The frame has a plurality of holes for selectively positioning the ram relative to the frame.

10 Claims, 4 Drawing Figures

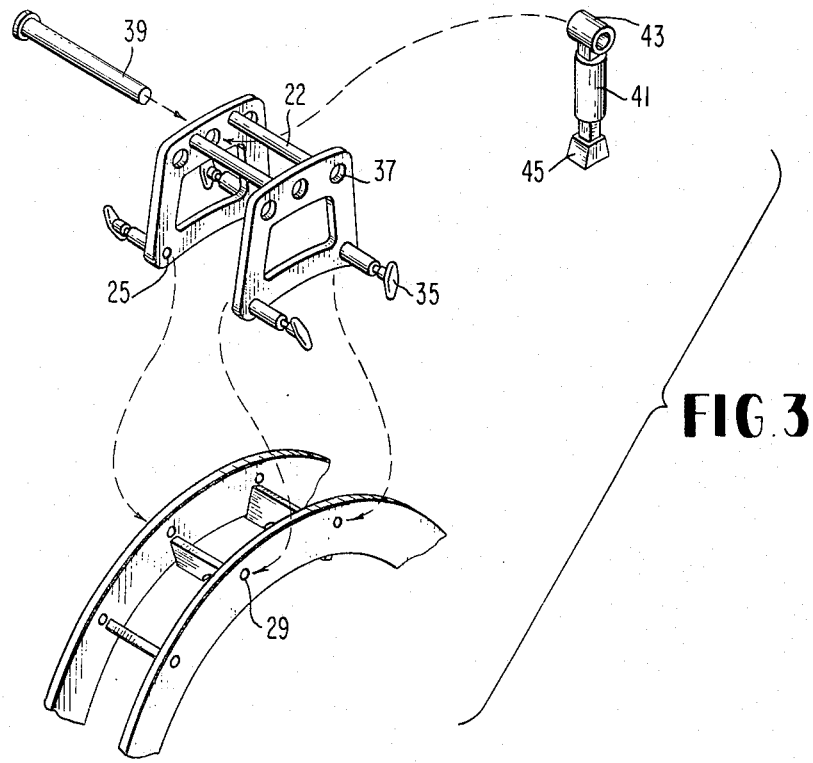
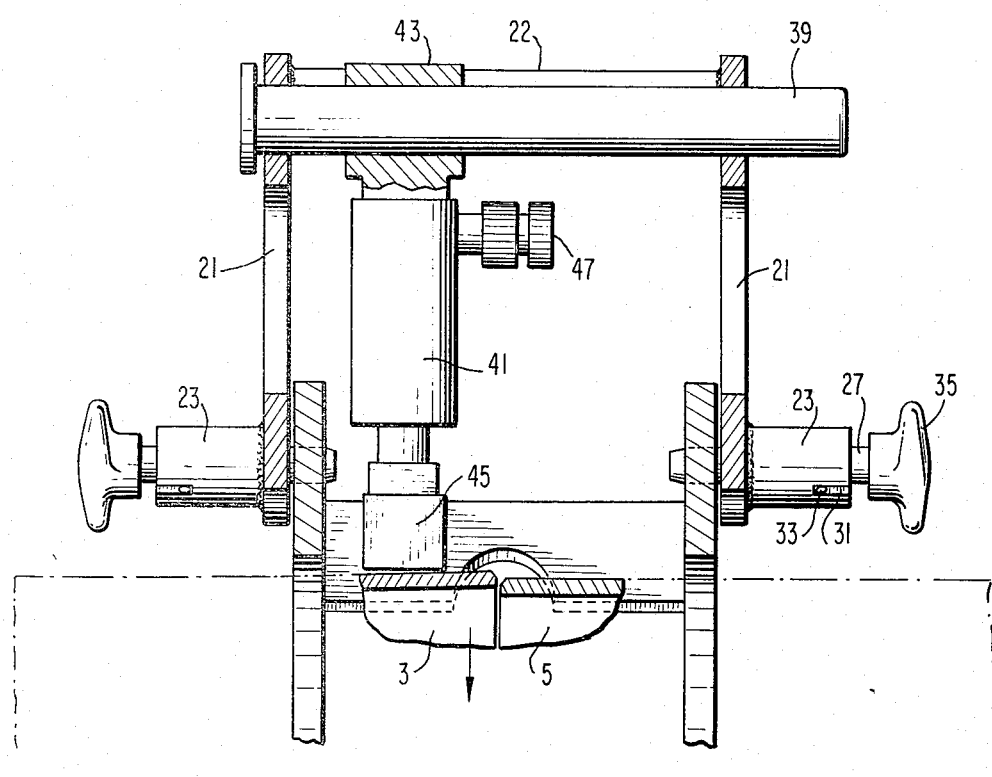

APPARATUS FOR ALIGNING PIPE ENDS

The present invention relates to apparatus for aligning pipe ends, and more particularly for aligning in closely contiguous relationship the ends of a plurality of end-to-end pipe sections in preparation for welding the same together.

In the construction of pipelines, a plurality of pipe sections are laid end-to-end, each successive section being butt welded to the immediately preceding section. In order to form a suitable base for the weld so that a fluidtight connection will result, it is obvious that the pipe sections must be not only coaxial but also closely contiguous entirely about the peripheries of the adjacent ends of the sections to be welded together. However, the large diameter pipe sections often used for pipeline construction are not precisely cylindrical even as manufactured; and during transportation to the job site and as a result of rough handling upon arrival, the pipe sections and more particularly the ends thereof often lose their circular contour.

Thus it often happens that when a pipe section is laid up endwise against its preceding section, the adjacent ends will be out of true to the point that it is useless to attempt to weld. Therefore, it has been a common practice in the past to beat down the high point on one of the two pipe ends. However, when the pipe has a relatively great thickness, and when inspection standards are strict, then turning the pipe ends with a hammer does not suffice.

A number of pipe welding clamps are also known, of the type that encircle the contiguous ends to be welded and that attempt to force the pipe ends into congruent relationship. However, these clamps do not exert sufficient pressure to make sure that all points about the periphery of the pipe ends match and are largely ineffective to ensure that a particular high point will be brought into round.

Accordingly, it is an object of the present invention to provide apparatus for aligning pipe ends which will exert extremely strong alignment forces from any selected point on the periphery of the pipe ends.

Another object of the present invention is the provision of such apparatus which can be precisely positioned both axially and peripherally of the pipe ends.

Finally, it is an object of the present invention to provide such apparatus, which will be relatively simple and inexpensive to manufacture, easy to assemble, adjust, operate, maintain and repair, and rugged and durable in use.

Other objects, features and advantages of the present invention will become apparent from a consideration of the following description, taken in connection with the accompanying drawings, in which:

FIG. 3 is a fragmentary exploded perspective view of apparatus according to the invention; and FIG. 4 is an enlarged fragmentary cross-sectional view taken on the line 4—4 of FIG. 1.

Figure 1:
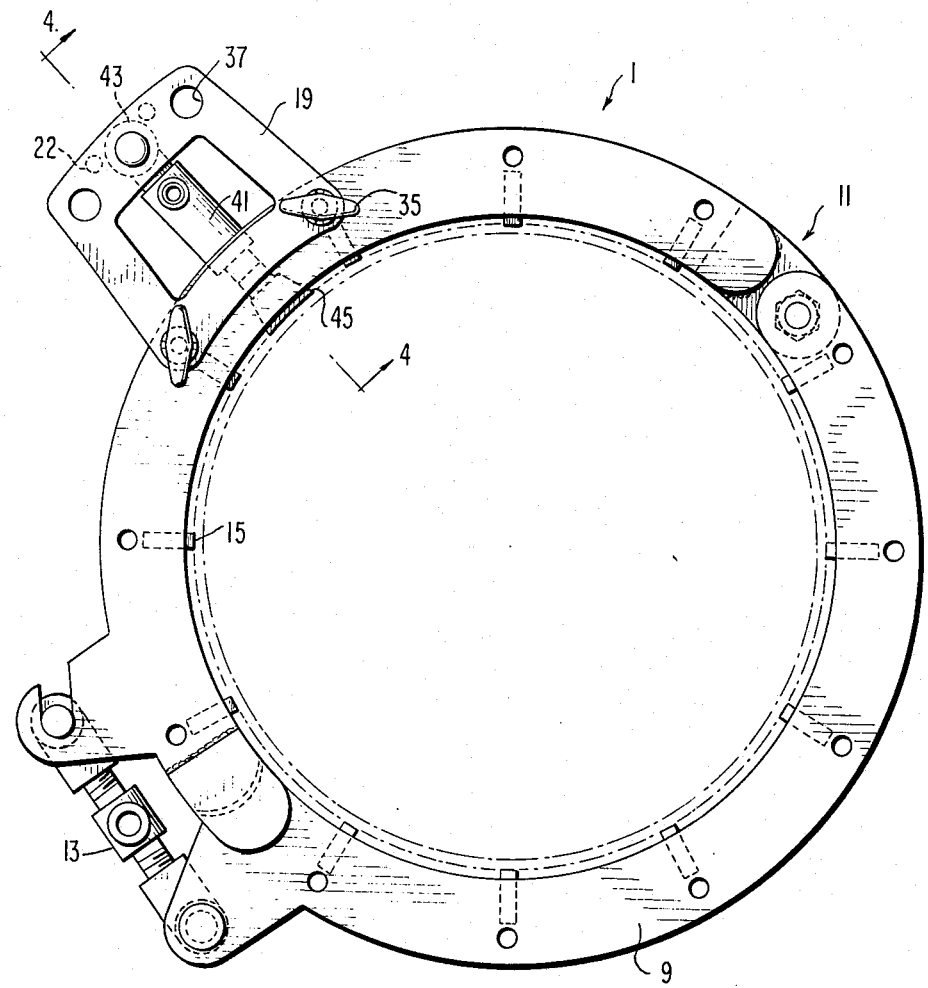
FIG. 1 is an elevational view of apparatus according to the present invention, viewed in the direction of the axis of the pipeline.
Figure 2:
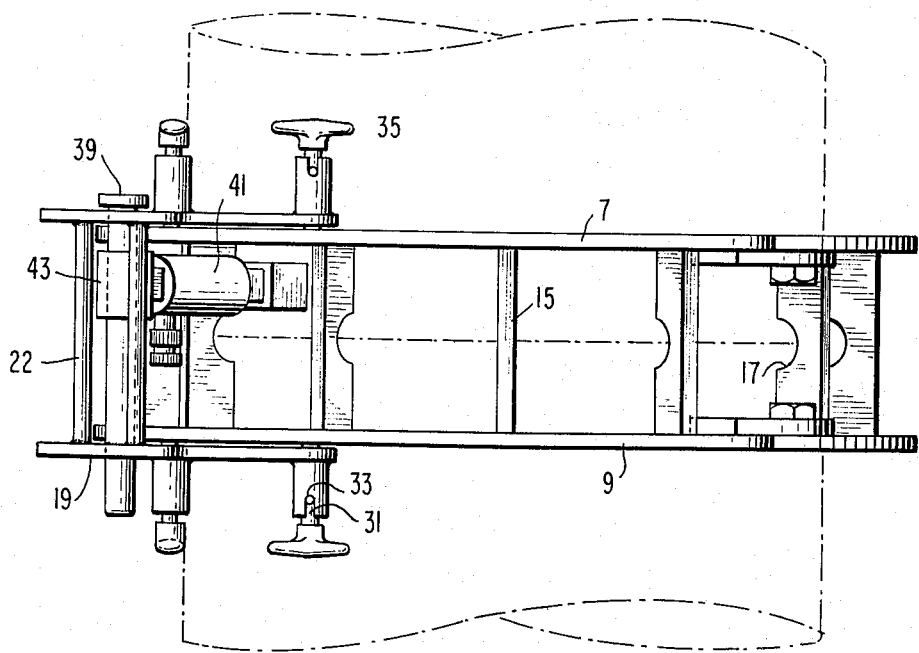
FIG. 2 is an elevational view of the apparatus viewed in a direction perpendicular to the axis of the pipeline.

Referring now to the drawings in greater detail, there is shown apparatus according to the present invention, comprising a line-up clamp indicated generally at 1 for attachment to and alignment of the adjacent ends of pipe sections 3 and 5. Clamp 1 comprises a pair of rings 7 and 9 each of which is in two halves hingedly interconnected at 11 and urged into closed or clamping relationship diametrically opposite their hinged connection by means of a turnbuckle 13. Cross bars 15 extend between and rigidly interconnect the corresponding halves of the rings 7 and 9 and are arched or cut away at 17 so as to permit complete welding around the pipe sections without removing the clamp, as will be appreciated from FIG. 2.

The structure described thus far is conventional.

The novel structure comprises a frame 19 made of a pair of identical plates 21 rigidly held together in spaced parallel relationship at a distance just greater than the distance between the outer sides of rings 7 and 9, by means of cross rods 22. Each plate 21 has a pair of spaced sleeves 23 secured to the outer side thereof. Each sleeve 23 surrounds a hole 25 through plate 21.

A bolt 27 is disposed in each sleeve 23 and hole 25 and is spring urged inwardly into releasable locking engagement in any selected one of a plurality of holes 29 spaced peripherally about each of rings 7 and 9. Sleeves 23 have endwise outwardly opening slots 31 therein for the reception of pins 33 carried by bolts 27. Handles 35 on the outer ends of bolts 27 permit the retraction and manipulation of bolts 27.

Along its outer edge remote from rings 7 and 9, each plate 21 has a plurality of openings 37 therethrough, which are disposed in an arcuate series concentric with the center of rings 7 and 9. Alternatively, as the sagitta of the arc on which holes 37 lie is relatively small, the holes may be disposed in a straight line. In either event, holes 37 are in aligned pairs on opposite sides of frame 19.

A bolt 39 is removably insertable in any of the aligned pairs of holes 37, and when inserted will be parallel to the common axis of the pipe sections and the rings 7 and 9.

A fluid pressure ram 41, which is preferably hydraulic, has a sleeve 43 on its outer end that slides on bolt 39 and a shoe 45 on its inner end that has a concave inner surface of the same radius as the pipe sections 3 and 5. Hydraulic connections 47 are provided, for supplying hydraulic fluid to and removing hydraulic from ram 41 from a source of hydraulic fluid under pressure (not shown).

In operation, the two pipe sections 3 and 5 are aligned as closely as possible and clamp 1, with the rings 7 and 9 open, is placed about the joint and closed and then tightened down on the joint by manipulation of the turnbuckle 13. This is merely the conventional mode of emplacing pipe welding clamps.

The clamped joint is then inspected to find high spots; and adjacent a high spot, the frame 19 is positioned as shown in the drawings, straddling the rings 7 and 9. The bolts 27 are retracted and the pins 33 ride on the outer ends of the sleeves 23, so that the inner ends of the bolts 27 do not yet project into the holes 29 on the rings 7 and 9.

The handles 35 are rotated one by one, until the pins 33 enter the slots 31 and the bolts 27 are urged inwardly to the FIG. 4 position by the coil-compression springs (not shown) within sleeves 23 that act between sleeves 23 and bolts 27 to urge bolts 27 inwardly, that is, toward the FIG. 4 position. As each bolt 27 thus moves inwardly, it enters a hole 29, it being possible to move frame 19 a little in any desired direction so as to permit the entry of the bolts 27 one by one into the holes 29. When all the bolts 27 are in the FIG. 4 position, then frame 19 is rigidly but releasably secured to the rings 7 and 9.

One of the pairs of holes 37 of frame 19 will radially outwardly overlie the center of the high point to be pressed in. The bolt 39 is inserted through one of that pair of holes 37 and then through sleeve 43 of ram 41 and then through the other of that pair of holes 37, so that the ram 41 has the FIG. 4 position. Ram 41 is then slid along bolt 39 to the left or right as seen in FIG. 4, until the high point on the pipe section 3 or 5 is directly beneath foot 45.

Thereupon, application of hydraulic pressure through fitting 47 to ram 41 causes shoe 45 to move radially inwardly to deform the high point of the pipe section 3 or 5 in the direction of the arrow in FIG. 4, to bring the pipe ends into congruity and alignment.

Thereupon, the weld can be effected at least in the area of frame 19, with shoe 45 remaining in place until the weld is formed and cooled.

It will be noted, in the illustrated embodiment, that there are twelve possible positions of frame 19 about the periphery of clamp 1. Thus the frame 19 is selectively positionable at increments of 30° about the periphery of the clamp. The provision of plural pairs of holes 37, however, subdivides the increments of position of frame 19, to permit more accurate positioning of ram 41. If there are three sets of holes 37, then the possible positions of ram 41 are spaced 10° apart about the periphery of clamp 1.

Similarly, the ability of ram 41 to slide on bolt 39 parallel to the axis of the clamp, makes it unnecessary to position clamp 1 precisely relative to the pipe ends, and makes it possible to select either pipe end for deformation.

It will of course be appreciated that other forms of releasable clamp can be used for selectively positioning frame 19 about the periphery of clamp 1, which other clamp forms need not necessarily involve the use of holes such as holes 29.

From a consideration of the foregoing disclosure, therefore, it will be apparent that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. Apparatus for aligning contiguous ends of a plurality of end-to-end pipe sections, comprising in combination ring means for surrounding the pipe sections adjacent their ends, the ring means having a plurality of holes therein peripherally spaced apart about said ring means, a frame, means for releaseably securing said frame in any peripherally adjacent pair of said holes, and an elongated longitudinally extensible ram mounted at its outer end on said frame and having a shoe at its inner end that presses radially inwardly against a said pipe end at a selected point about the periphery of said pipe end upon extension of said ram.

2. Apparatus as claimed in claim 1, said ram comprising a hydraulic ram.

3. Apparatus as claimed in claim 1, said ring means comprising a pair of parallel spaced apart concentric rings rigidly interconnected by cross members, the said holes in one ring being aligned with the said holes in the other said ring, said frame being releasably secured in four holes comprising a said peripherally adjacent pair of holes in each said ring.

4. Apparatus as claimed in claim 3, said frame straddling said ring means on the outer side of each said ring which is opposite the other said ring.

5. Apparatus as claimed in claim 4, said frame comprising a pair of plates one disposed on each said opposite side of each said ring, and means rigidly securing the plates together.

6. Apparatus as claimed in claim 5, and a plurality of holes through each said plate axially aligned with a plurality of holes through the other said plate of said frame, said frame holes being spaced apart peripherally about said ring means, a bolt selectively engageable in any aligned pair of frame holes, said bolt releaseably passing through said outer end of said ram.

7. Apparatus as claimed in claim 6, there being a sleeve secured to the outer end of said ram that rotatably receives said bolt, said bolt being parallel to the axis of said ring means.

8. Apparatus as claimed in claim 5, said plates being parallel to each other and perpendicular to the axis of the ring means.

9. Apparatus as claimed in claim 3, said holes in said ring means being in radial alignment with said cross members.

10. Apparatus as claimed in claim 5, said releaseable securing means comprising a plurality of bolts carried by said plates on the outer side of each of said plates and movable pairwise toward and away from each other respectively to secure said frame to said ring means and to release said frame from securement to said ring means.

\* \* \* \* \*